United States Patent
Zhan et al.

(10) Patent No.: US 10,783,368 B2
(45) Date of Patent: Sep. 22, 2020

(54) METHOD AND APPARATUS FOR IDENTIFYING INTERSECTION IN ELECTRONIC MAP

(71) Applicant: Baidu Online Network Technology (Beijing) Co., Ltd., Beijing (CN)

(72) Inventors: Yifei Zhan, Beijing (CN); Miao Yan, Beijing (CN); Wang Zhou, Beijing (CN); Xianpeng Lang, Beijing (CN); Xiong Duan, Beijing (CN); Changjie Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/230,706

(22) Filed: Dec. 21, 2018

(65) Prior Publication Data
US 2019/0205640 A1    Jul. 4, 2019

(30) Foreign Application Priority Data

Dec. 29, 2017   (CN) .......................... 2017 1 1482987

(51) Int. Cl.
*G06K 9/00*      (2006.01)
*G06K 9/46*      (2006.01)

(52) U.S. Cl.
CPC ..... *G06K 9/00476* (2013.01); *G06K 9/00798* (2013.01); *G06K 9/4638* (2013.01)

(58) Field of Classification Search
CPC .......... G06K 9/00476; G06K 9/00798; G06K 9/4638; G06K 9/342; G06K 9/00651
See application file for complete search history.

(56) References Cited

U.S. PATENT DOCUMENTS

| 5,751,852 A * | 5/1998 | Marimont ............ G06K 9/4638 382/180 |
| 8,768,012 B2 * | 7/2014 | Satoh ..................... G01C 21/30 382/113 |

(Continued)

FOREIGN PATENT DOCUMENTS

| JP | H08335264 A | 12/1996 |
| JP | 2001-101598 A | 4/2001 |

(Continued)

OTHER PUBLICATIONS

Andreas Geiger et al.; "3D Traffic Scene Understanding from Movable Platforms"; IEEE Transactions on Pattern Analysis and Machine Intelligence, vol. 36, No. 5, pp. 1012-1025; May 2014, XP 11546876 A (14 pages)

(Continued)

*Primary Examiner* — John B Strege
(74) *Attorney, Agent, or Firm* — Nixon Peabody LLP

(57) ABSTRACT

A method and apparatus for identifying an intersection in an electronic map, and a computer readable medium are provided. An embodiment of the method includes: acquiring boundary information related to road boundaries from an electronic map; determining a topological relationship between the road boundaries in an area having a predetermined size in the electronic map based on the boundary information; and determining a distribution of an intersection in the area based on the topological relationship. The apparatus corresponding to the method, the device implementing the method of the present disclosure, and the computer readable medium are also provided. Through the technical solutions, the intersection may be automatically identified by detecting the road boundaries, which improves the efficiency of producing a high-precision map, and has the (Continued)

advantage of high accurate recall rate, strong universality, or simple method.

15 Claims, 7 Drawing Sheets

(56) References Cited

U.S. PATENT DOCUMENTS

| | | | |
|---|---|---|---|
| 9,081,383 B1 | 7/2015 | Montemerlo | |
| 2001/0040984 A1* | 11/2001 | Kambe | G09B 29/106 382/113 |
| 2003/0165258 A1* | 9/2003 | Kubota | G06T 7/66 382/113 |
| 2008/0123902 A1* | 5/2008 | Park | G06K 9/00798 382/104 |
| 2012/0128216 A1* | 5/2012 | Satoh | G01C 21/30 382/113 |
| 2012/0148104 A1* | 6/2012 | Nanri | G01C 21/3697 382/103 |
| 2015/0110344 A1* | 4/2015 | Okumura | G06K 9/00624 382/103 |
| 2015/0154458 A1* | 6/2015 | Lee | G06K 9/00798 348/118 |
| 2015/0242674 A1* | 8/2015 | Ahmed | G06K 9/00637 382/113 |
| 2018/0307934 A1* | 10/2018 | Podoplelov | G06K 9/4638 |

FOREIGN PATENT DOCUMENTS

| | | | |
|---|---|---|---|
| JP | 2002-257578 A | 9/2002 |
| JP | 2005-222538 A | 8/2005 |
| JP | 2009-115530 A | 5/2009 |
| JP | 2009-265400 A | 11/2009 |
| JP | 2010-008261 A | 1/2010 |
| JP | 2013-225336 A | 10/2013 |
| JP | 2013-089143 A | 7/2015 |
| JP | 2014-115904 A | 4/2017 |
| KR | 10-2014-0082159 A | 7/2014 |

OTHER PUBLICATIONS

Kodagoda, R.S. et al.; "Road Curb and Intersection Detection Using a 2D LMS"; Proceedings of 2002 IEEE/RSJ Intl. Conf. on Intelligent Robots and Systems, pp. 19-24; EPFL, Lausanne, Switzerland; Oct. 2002; XP 10609222A (6 pages).

* cited by examiner

METHOD AND APPARATUS FOR IDENTIFYING INTERSECTION IN ELECTRONIC MAP

CROSS-REFERENCE TO RELATED APPLICATIONS

This application claims priority to Chinese Patent Application no. 201711482987.5, filed in China on Dec. 29, 2017, the contents of which are incorporated herein by reference in their entirety.

TECHNICAL FIELD

The present disclosure generally relates to the field of electronic map, and specifically to a method and apparatus for identifying an intersection in an electronic map, and a computer readable medium.

BACKGROUND

The electronic map, especially the high-precision map, has provided the convenience for users in many aspects. For example, the functions of location finding, automatic navigation, and autonomous driving provided by the electronic map cannot be replaced at present and in the future.

However, with the increase of the coverage of the high-precision map, in the map production work, higher requirements on the identification for various kinds of acquired information have been brought forward. At present, a map manufacturer constructs a road surface model mainly based on laser point clouds. That is, related point cloud data is acquired by sensing laser light returning from object surfaces with a laser sensor. The positions and types of road intersections in massive point cloud data need to be manually annotated, resulting in a low production efficiency and a possible error and omission. In addition, there is the technique of identifying an intersection using a machine learning method, but a large number of samples also need to be manually annotated. Accordingly, there are also the problems that the efficiency is low and the accuracy cannot be ensured.

Therefore, a technique of identifying the intersections in the electronic map is urgently required to enhance the efficiency under the premise of ensuring the accuracy.

SUMMARY

According to illustrative embodiments of the present disclosure, a solution for identifying an intersection in an electronic map is provided.

In a first aspect, the present disclosure provides a method for identifying an intersection in an electronic map. The method includes: acquiring boundary information related to road boundaries from an electronic map. The method further includes determining a topological relationship between the road boundaries in an area having a predetermined size in the electronic map based on the boundary information. In addition, the method further includes determining a distribution of an intersection in the area based on the topological relationship.

In some embodiments, the topological relationship at least includes the number of the road boundaries in the area, and the number of a road boundary pair among the road boundaries. The road boundaries may contain road direction information. The number of the road boundary pair may be determined by: determining, for a first road boundary in the road boundaries, a second road boundary having a minimum distance from the first road boundary based on the road direction information of the first road boundary, wherein an direction of the first road boundary is identical to an direction of the second road boundary; determining whether an angle between a tangent line to the first road boundary and the tangent line to the second road boundary is within a preset range; and adding one to the number of the road boundary pair if the angle between the tangent lines is within the preset range.

In some embodiments, the topological relationship at least includes the number of the road boundaries in the area, and the number of the road boundary pair among the road boundaries. The determining a distribution of an intersection in the area based on the topological relationship may include: determining, in response to the topological relationship indicating the number of the road boundaries being four and the number of the road boundary pair being three, an existence of the intersection in the area, a type of the intersection being a merging junction or fork junction.

In some embodiments, the road boundaries may contain road direction information. The method further may further include: determining the number of the road boundary pair pointing to the intersection in the three road boundary pairs based on the road direction information; determining, in response to the number of the road boundary pair pointing to the intersection being one, the intersection as the fork junction; and determining, in response to the number of the road boundary pair pointing to the intersection being two, the intersection as the merging junction.

In some embodiments, the topological relationship at least includes the number of the road boundaries in the area, and the number of the road boundary pair among the road boundaries. The determining a distribution of an intersection in the area based on the topological relationship may include: determining, in response to the topological relationship indicating the number of the road boundaries being three and the number of the road boundary pair being three, an existence of the intersection in the area, a type of the intersection being a T junction.

In some embodiments, the topological relationship at least includes the number of the road boundaries in the area, and the number of the road boundary pair among the road boundaries. The determining a distribution of an intersection in the area based on the topological relationship may include: determining, in response to the topological relationship indicating the number of the road boundaries being four and the number of the road boundary pair being four, an existence of the intersection in the area, a type of the intersection being a crossroad.

In some embodiments, the topological relationship at least includes the number of the road boundaries in the area, and the number of the road boundary pair among the road boundaries. The determining a distribution of an intersection in the area based on the topological relationship may include: determining, in response to the topological relationship indicating a starting point and an ending point of one of the road boundaries in the area being substantially coincident, an existence of the intersection in the area, a type of the intersection being a roundabout.

In some embodiments, the topological relationship at least includes the number of the road boundaries in the area, and the number of the road boundary pair among the road boundaries. The acquiring boundary information related to road boundaries from an electronic map may include: determining a jump point from laser point cloud data used for generating the electronic map, wherein data of the jump point indicates a jump of a road height; and identifying the road boundaries based on the jump point.

In a second aspect, the present disclosure provides an apparatus for identifying an intersection in an electronic map. The apparatus includes: a boundary information acquisition module, configured to acquire boundary information related to road boundaries from an electronic map; a topological relationship determination module, configured to determine a topological relationship between the road boundaries in an area having a predetermined size in the electronic map based on the boundary information; and an intersection distribution determination module, configured to determine a distribution of an intersection in the area based on the topological relationship.

In a third aspect, the present disclosure provides a device. The device includes one or more processors; and a storage device, configured to store one or more programs. The one or more programs, when executed by the one or more processors, cause the one or more processors to implement the method according to the first aspect of the present disclosure.

In a fourth aspect, the present disclosure provides a computer readable medium storing a computer program. The program, when executed by a processor, implements the method according to the first aspect of the present disclosure.

It should be understood that the contents described in the present disclosure are not intended to limit crucial or essential features of some embodiments of the present disclosure, and not used to limit the scope of the present disclosure. Other features of the present disclosure will be easily understood through the following descriptions.

BRIEF DESCRIPTION OF THE DRAWINGS

The above and other features, advantages, and aspects of some embodiments of the present disclosure will become more apparent in combination with the accompanying drawings and with reference to the following detailed descriptions. In the accompanying drawings, the same or similar reference numerals represent the same or similar elements.

DETAILED DESCRIPTION OF EMBODIMENTS

Figure 1:
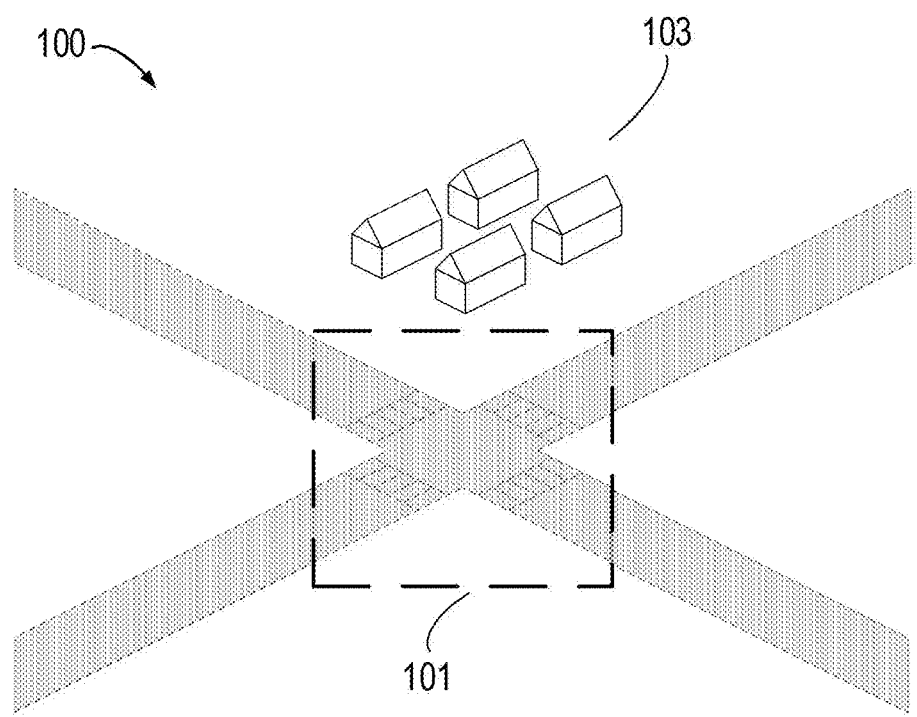
FIG. 1 illustrates a schematic diagram of an illustrative environment in which a plurality of embodiments of the present disclosure can be implemented.

Some embodiments of the present disclosure will be further described in more detail below with reference to the accompanying drawings. Some embodiments of the present disclosure are shown in the accompanying drawings. However, it should be appreciated that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

In the description for some embodiments of the present disclosure, the term "comprising" and similar terms thereof should be understood as open-ended (i.e., "including, but not limited to"). The term "based on" should be understood as "at least partially based on." The term "an embodiment" or "the embodiment" should be understood as "at least one embodiment." The terms "first," "second," and the like may refer to different or identical objects. Other explicit and implicit definitions may also be included hereinafter.

As mentioned above, in order to identify the intersection in the electronic map and the type of the intersection, in the traditional solution, the identifying is achieved in a manual way or through a deep learning method which needs a large number of samples and a large amount of training. These solutions have defects in various aspects such as accuracy, universality, and cost. For example, it is very likely to cause an incorrect calibration due to strong human factors in the manual way and the deep learning method. The various intersections may be accurately identified by controlling the human factors as much as possible. However, it is infeasible in the practical application due to the excessive investment in time and labor cost.

In addition, whether the intersection is identified in the manual way or through the deep learning method, the idea thereof is to directly use the intersection itself as the identified object, to directly identify the various types of intersections from an image or a laser point cloud. There are various types of intersections (a merging junction, a fork junction, a T junction, a crossroad, a roundabout, etc.), and the road materials (cement, and asphalt), the road colors (white, ochre, and black), and the road widths are different from each other. Therefore, various situations need to be considered when the intersection is identified. Even though the deep learning method is used, the large number of samples and the large amount of training are also needed. Accordingly, not only the production efficiency is low, but also the accurate recall rate cannot be guaranteed.

In general, according to some embodiments of the present disclosure, the technical solutions of identifying an intersection in an electronic map are provided. Different from the existing technique in which the identification operation is performed on the intersection itself, in these solutions, by extracting road boundaries in a specific area of the electronic map, the distribution of the intersection is deduced based on the topological relationship between the road boundaries. When the electronic map is a high-precision map produced based on the laser point cloud technology, in these solutions, road surface information may first be extracted from the three-dimensional scene generated by stitching vehicle mounted laser point clouds, and then the road boundary information may be extracted from the road information. Thus, the topological relationship between the road boundaries in the specific area may be obtained. If the types of the intersections are different, the topological relationship between the road boundaries connected to the intersections are different. Therefore, these solutions identify the distribution of the intersection using this principle.

As used herein, the term "topological relationship" refers to the interrelationship between spatial data satisfying the principle of the topological geometry, and in data is mainly used to represent information such as the direction and the number of the road boundaries. Since the relative orientations between the road boundaries and the number of the road boundaries are only considered in the "topological relationship," not including the specific positions and the specific lengths of the road boundaries, the computing resources can be saved.

In some embodiments of the present disclosure, the road boundary information is extracted from the electronic map, then the topological relationship between the road boundaries is generated, and then the type of the intersection is identified based on the topological relationship. Thus, the electronic map may be a two-dimensional map that is still in use today, or may be a three-dimensional high-precision map that will be widely used in the future. Additionally or alternatively, since the solutions of the present disclosure indirectly identify the distribution of the intersection by detecting the road boundaries, the solutions may be applied to any other electronic map.

Some embodiments of the present disclosure will be specifically described below with reference to the accompanying drawings.

FIG. 1 illustrates a schematic diagram of an illustrative environment 100 in which a plurality of embodiments of the present disclosure can be implemented. The illustrative environment 100 is obtained by performing a three-dimensional reconstruction on a scene from vehicle mounted laser point clouds. For example, an acquisition entity (not shown) provided with a laser point cloud device runs on the road in the illustrative environment 100. The laser point cloud device records environmental information within a specific range (for example, the range with a radius of 400 meters) frame by frame. The environmental information may include, but not limited to, the building information 103 and the road information 101. After the laser point cloud device finishes the acquisition for the environmental information, the map manufacturer may perform stitching on laser point clouds according to the sets of the environmental information, thereby completing the three-dimensional reconstruction of the scene. Accordingly, the perspective view of the illustrative environment shown in FIG. 1 is obtained.

As described above, the existence of the intersection 101 and the type of the intersection are currently identified in a manual way or through a deep learning method. Since the actually reconstructed three-dimensional scene contains massive intersections 101, the workload of identifying the intersections 101 is heavy. In order to at least partially address the above and other potential problems and defects, the plurality of embodiments of the present disclosure provide novel intersection identification solutions. The solutions can be mainly divided into two parts. One part is the specific approach for acquiring the boundary information related to the road boundaries, and the other part is to establish the corresponding relationship between the topological relationship of the road boundaries and the type of the intersection.

Figure 2:
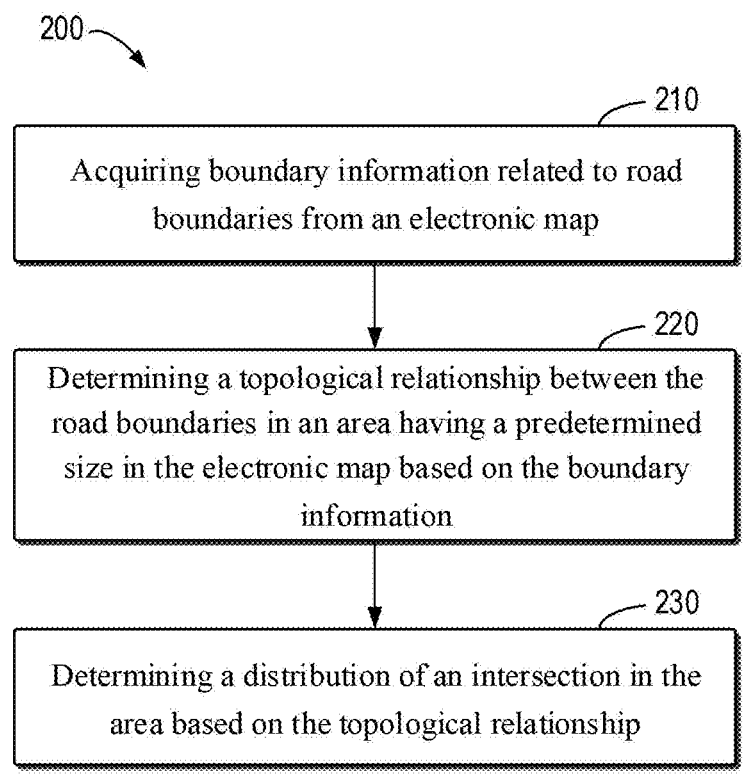
FIG. 2 illustrates a flowchart of a process of identifying an intersection in an electronic map according to some embodiments of the present disclosure.

The main idea of the present disclosure is to identify the specific arrangement of the intersection according to the topological relationship of the road boundaries in the specific area. The flow of identifying the intersection in the electronic map will be described in detail below with reference to FIG. 2. FIG. 2 illustrates a flowchart of a process 200 of identifying an intersection in an electronic map according to some embodiments of the present disclosure. In some embodiments, the method 200 may be implemented in the apparatus shown in FIG. 10 below.

At block 210, the boundary information related to the road boundaries is acquired from the electronic map. In some embodiments, the road surface information related to the road surface may first be obtained from the illustrative environment 100 of the electronic map. Then, the boundary information related to the road boundaries may be acquired from the road surface information. Alternatively or additionally, the boundary information related to the road boundaries may be directly obtained from the illustrative environment 100 of the electronic map.

Figure 3:
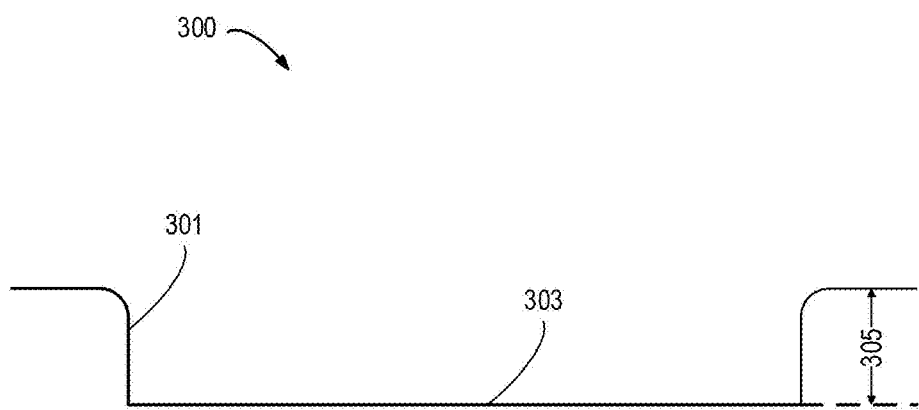
FIG. 3 illustrates a schematic diagram of acquiring boundary information related to road boundaries according to some embodiments of the present disclosure.

For ease of understanding, FIG. 3 exemplarily illustrates a schematic diagram of acquiring the boundary information related to the road boundaries according to some embodiments of the present disclosure. As shown in FIG. 3, the feature 300 is a section perpendicular to the forward direction of the acquisition entity provided with the laser point cloud device, and the forward direction is the direction in which the acquisition entity enters into the accompanying drawing sheet. In the section shown in the feature 300, the road surface 303 and the road boundaries 301 on both sides of the road surface 303 are included. After a set of a plurality of features 300 is reconstructed into the three-dimensional scene as described above, the boundary information related to the road boundaries 301 needs to be acquired from the scene (or corresponding laser point clouds).

In some embodiments, a jump point may be determined from the laser point clouds of the electronic map that are used for reconstructing the three-dimensional scene, the data of the jump point is used to indicate the jump of the road height. As shown in FIG. 3, the steep jump height 305 may be detected through a corresponding algorithm, and thus, the jump point is detected. The current road surfaces in the cities for motor vehicles to run are flat road surfaces. Therefore, when the jump point is detected on the road surface, it may be initially determined that the jump point is a component of the boundary of the road surface, which is more accurate, simpler and more effective as compared with the current process of detecting the boundaries of the road surface through image recognition. Alternatively or additionally, the jump point 305 may be detected from the image using an algorithm such as a cumulative sum (CUSUM) algorithm or an adaptive threshold algorithm, which can simplify the process of collecting the jump point. In addition, a growth algorithm may be used within the point cloud of the road surface (i.e., an upward growth based on the ground plane where the acquisition entity provided with the laser point cloud device is located). This growing process can obtain the point cloud of the road surface. All the height jump points (road boundary points) may be selected for standby. In this way, the detected jump point 305 may be used as a point of the to-be-extracted road boundary.

Afterwards, the set of jump points 305 may be regarded as the boundary information related to the road boundaries 301, thereby achieving the acquisition of the road boundary information. In some embodiments, the extracted height jump points (road boundary points) are vectorized using a predetermined algorithm, to fit the curves of the road boundaries. Through the process of fitting the curves, jump points (e.g., sundries on the road surface, and unconventional protrusions) that cannot represent the road boundaries may be removed. In some embodiments, the set of height jump points may be vectorized using an alpha-shape algorithm, to remove the incorrectly detected or interfering jump points. In still some embodiments, the inner and outer sides of the road boundary may be determined by identifying the positions of the jump points relative to the road surface, to distinguish whether the road boundary is the left road boundary (also referred to as the "first road boundary") or a right road boundary (also referred to as the "second road boundary"), so as to identify the road boundary pair in the subsequent steps. According to the above method, all the road boundaries in the specific area may be acquired. As compared with the existing method in which the electronic map is used as the detected object, using the road boundaries as the detected object may greatly save the computing resources.

In addition, after the boundary information related to the road boundaries is acquired, the topological relationship between the road boundaries may be generated, and the specific arrangement of the intersection is determined based on the topological relationships in various ways as follows. In some embodiments, the topological relationship may include the number of the road boundaries and the number of the road boundary pair. The numbers of the road boundaries related to the intersections of different types are basically different, and the numbers of the road boundary pair related to the intersections of different types are basically different. Therefore, the specific arrangement of the intersection may be completely determined by identifying the topological relationship related to the numbers of the road boundaries and the numbers of the road boundary pair. Alternatively or additionally, the topological relationship may include the numbers of the road boundaries, the numbers of the road boundary pair, and the numbers of road boundary pair that point to the intersections, so as to further differentiate the specific types of the intersections having similar topological relationships. The process of establishing the corresponding relationship between the topological relationship of the road boundaries and the intersection type will be described in detail below.

Returning to FIG. 2, at block 220, the topological relationship between the road boundaries in the area 101 having a predetermined size in the illustrative environment 100 of the electronic map is determined based on the boundary information. In some embodiments, the topological relationship may include the number of the road boundaries in the area 101 and the number of the road boundary pair among the road boundaries. Alternatively or additionally, the topological relationship may further include the number of the road boundary pair that point to the intersection.

For ease of understanding, the topological relationships between the road boundaries and the corresponding intersection types are described in combination with FIGS. 4A-8. It should be noted that the topological relationships shown in FIGS. 4A-8 are all illustrative. Other modifications and variations within the scope of protection claimed by the present disclosure are applicable to the technique of identifying the specific arrangement of the intersection described in the present disclosure.

Figure 4A:
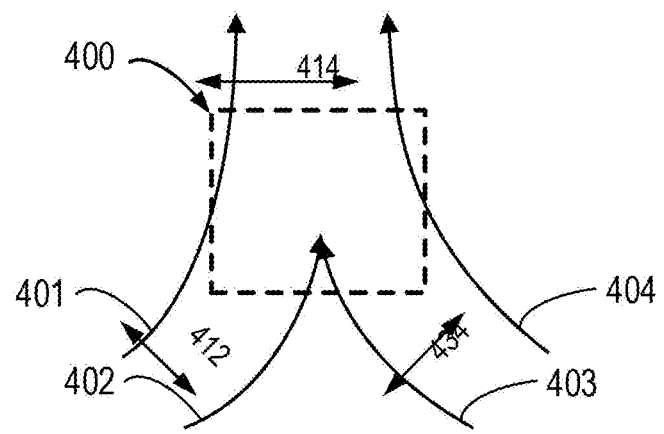
FIGS. 4A and 4B respectively illustrate a topology diagram of road boundaries of a merging junction and a topology diagram of road boundaries of a fork junction according to some embodiments of the present disclosure.
Figure 4B:
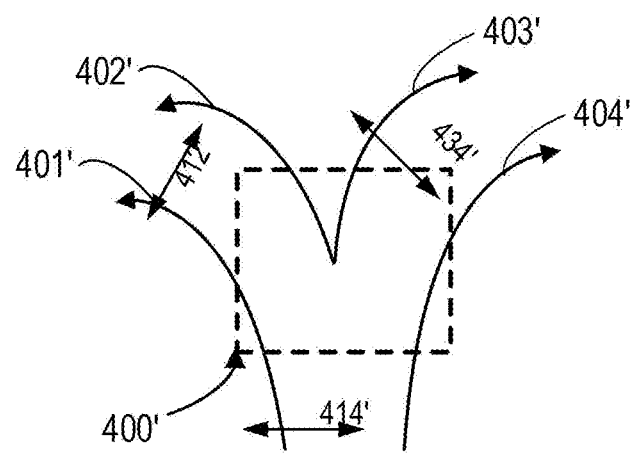

FIGS. 4A and 4B respectively illustrate a topology diagram of road boundaries of a merging junction 400 and a topology diagram of road boundaries of a fork junction 400' according to some embodiments of the present disclosure. FIG. 4A shows the four acquired road boundaries 401, 402, 403, and 404, and FIG. 4B shows the four acquired road boundaries 401', 402', 403', and 404'. In addition, as indicated by the bidirectional arrows, the pairing relationships 412, 414 and 434 of the road boundaries are further shown in FIG. 4A, and the pairing relationships 412', 414' and 434' of the road boundaries are further shown in FIG. 4B. That is, there are three road boundary pairs in both FIG. 4A and FIG. 4B. That is, if it is indicated in the topological relationship that the number of the road boundaries is four and the number of the road boundary pair is three, it is determined that there is an intersection 400 or 400' in the area, whose type is the merging junction or the fork junction. In this way, the type of the intersection may be automatically identified, which improves the production efficiency of the map, and has the strong universality.

According to some embodiments of the present disclosure, the number of the road boundaries may be determined based on image processing (e.g., an edge detection, and a contour detection), a manual annotation, a prior knowledge, and/or any proper way.

In some embodiments, the number of the road boundary pair present in the given area of the map may be determined in the following ways. First, for the left road boundary (otherwise known as "first road boundary," for example, 401 in FIG. 4A) in the road boundaries in the area, the right road boundary (otherwise known as "second road boundary," for example, 402 in FIG. 4A) having the minimum distance from the left road boundary in the specific area may be determined based on the road direction information (as indicated by the narrow of each road boundary). Alternatively, for the right road boundary in the road boundaries in the area, the left road boundary having the minimum distance from the right road boundary may be determined based on the road direction information. In addition, the left road boundary is in the same direction as the right road boundary. Through this step, the misidentifications for the parallel dual carriageway (a separation strip existing in the middle) and the two-way lane without guardrails may be substantially avoided.

Thereafter, it is necessary to determine whether the tangent line to the left road boundary and the tangent line to the right road boundary are substantially parallel, or the left road boundary and the right road boundary are parallel to each other within a specific distance. In some embodiments, it may be determined whether an angle between the tangent line to the left road boundary and the tangent line to the right road boundary is within a preset range. If the angle between the tangent line to the left road boundary and the tangent line to the right road boundary is within the preset range, one road boundary pair is identified, and thus the number of the road boundary pair is added by one in the process. In some embodiments, the preset range of the angle may be from 0° to 30°. Alternatively, the preset range of the angle may be from 0° to 20°. Additionally, the preset range of the angle may be from 0° to 10° or 0° to 5°. Through this step, the misidentification for two road boundaries (e.g., the two boundaries 402 and 403 in the middle of FIG. 4A, and the two boundaries 402' and 403' in the middle of FIG. 4B) that do not belong to the same road surface may be substantially avoided.

As described above, based on the topological relationships shown in FIGS. 4A and 4B, it is possible to identify that there is the intersection in the area that is the merging junction or the fork junction. For whether the intersection is the merging junction or the fork junction, it may be identified in the following way. In some embodiments, as indicated by the arrow of the each road boundary in the drawings, the each road boundary may contain road direction information. As shown in FIG. 4A, when the number of the road boundary pair pointing to the intersection 400 is two, it is determined that the intersection 400 is the merging junction. As also shown in FIG. 4B, when the number of the road boundary pair pointing to the intersection 400' is one, it is determined that the intersection 400' is the fork junction. Through this step, the confusing identification for the merging junction and the fork junction may be substantially avoided.

Figure 5:
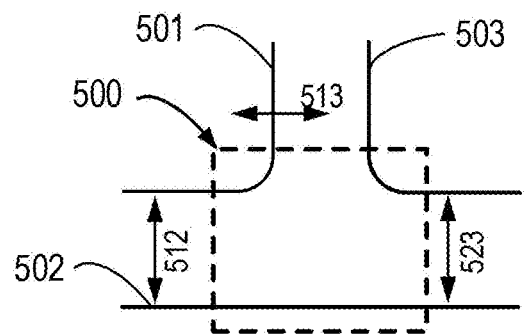
FIG. 5 illustrates a topology diagram of road boundaries of a T junction according to some embodiments of the present disclosure.

FIG. 5 illustrates a topology diagram of road boundaries of a T junction 500 according to some embodiments of the present disclosure. There are three acquired road boundaries 501, 502, and 503 in FIG. 5. Moreover, as indicated by the bidirectional arrows, there are also three pairing relationships 512, 513, and 523 (i.e., there are three road boundary pairs in FIG. 5). That is, if it is indicated in the topological relationship that the number of the road boundaries is three and the number of the road boundary pair is three, it may be determined that there is the intersection 500 whose type is the T junction in the area.

Figure 6:
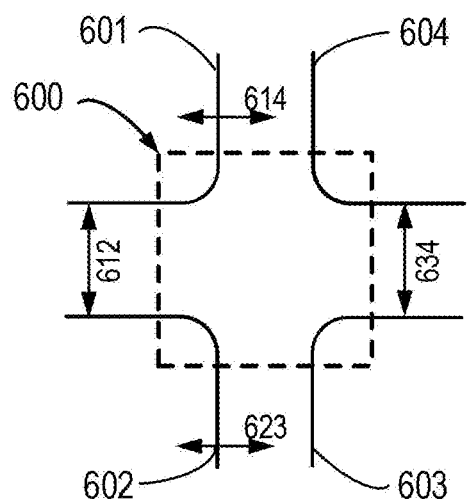
FIG. 6 illustrates a topology diagram of road boundaries of a crossroad according to some embodiments of the present disclosure.

FIG. 6 illustrates a topology diagram of road boundaries of a crossroad 600 according to some embodiments of the present disclosure. The identification approach for FIG. 6 is similar to that for FIGS. 4A, 4B, and 5. There are four road boundaries 601, 602, 603, and 604 in FIG. 6, and as indicated by the bidirectional arrows, there are also four pairing relationships 612, 623, 634, and 614 (i.e., there are four road boundary pairs in FIG. 6). That is, if it is indicated in the topological relationship that the number of the road boundaries is four and the number of the road boundary pair is four, it may be determined that there is the intersection 600 whose type is the crossroad in the area.

Figure 7:
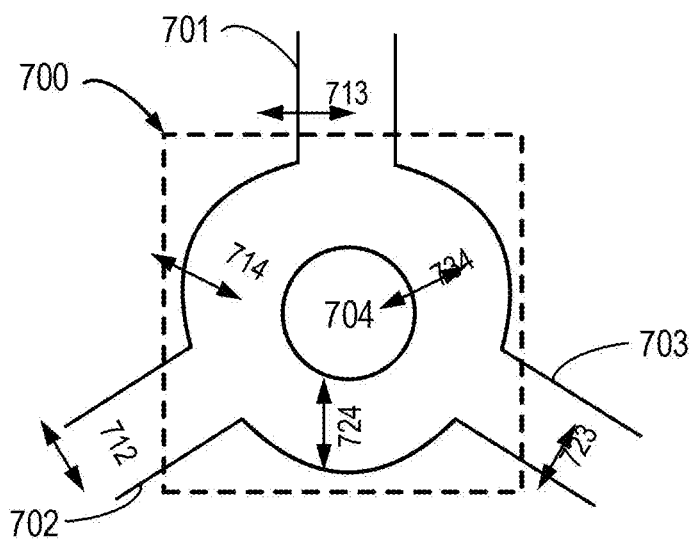
FIG. 7 illustrates a topology diagram of road boundaries of a roundabout according to some embodiments of the present disclosure.

FIG. 7 illustrates a topology diagram of road boundaries of a roundabout 700 according to some embodiments of the present disclosure. The identification approach for FIG. 7 is not identical to that for FIGS. 4A-6. There is one closed road boundary 704 in FIG. 7. When the closed road boundary 704 is identified, it is determined that there is the intersection 700 that contains the roundabout 704. In some embodiments, if it is indicated in the topological relationship that the starting point and the ending point of one of the road boundaries are substantially coincident in the area (e.g., the vector difference between the starting point and the ending point is within a predetermined range), it is determined that there is the intersection 700 whose type is the roundabout in the area.

In some embodiments, there may be different types of roundabouts 700. For example, there is a three-lane roundabout. As shown in FIG. 7, there are three road boundaries 701, 702, and 703. As indicated by the bidirectional arrows, there are also six pairing relationships 712, 713, 714, 723, 724, and 734. That is, there are six road boundary pairs in FIG. 7. That is, if it is indicated in the topological relationship that the number of the road boundaries is three and the number of the road boundary pair is six, it may be determined that there is the intersection 700 whose type is the three-lane roundabout in the area. Alternatively or additionally, there are also corresponding topological relationships in other roundabouts, for example, a four-lane roundabout (not shown), a five-lane roundabout (not shown), and a six-lane roundabout (not shown), which will not be repeatedly described herein.

Figure 8:
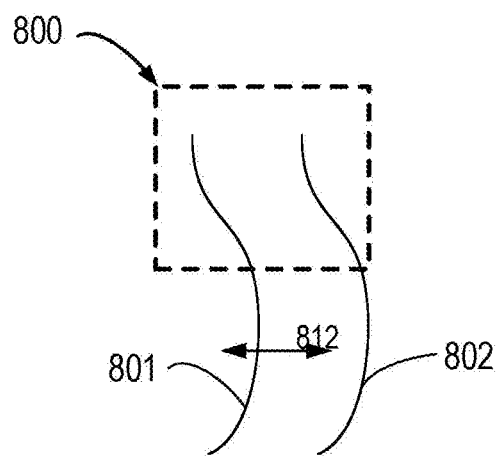
FIG. 8 illustrates a topology diagram of road boundaries of a common road (no intersection) according to some embodiments of the present disclosure.

FIG. 8 illustrates a topology diagram of road boundaries of a common road 800 (no intersections) according to some embodiments of the present disclosure. Significantly different from FIGS. 4A-7, there are only two road boundaries 801 and 802 in FIG. 8, and as indicated by the bidirectional arrow, the two road boundaries form a road boundary pair 812. That is, if it is indicated in the topological relationship that the number of the road boundaries is two and the number of the road boundary pair is one, it may be determined that there are no intersections in the area.

Returning to FIG. 2, at block 230, the distribution of the intersection in the area 101 is determined based on the topological relationship. As described above with reference to FIGS. 4A-8, in some embodiments, the distribution of the intersection is identified through the following parallel determination. When it is indicated in the topological relationship that the number of the road boundaries is four and the number of the road boundary pair is three, it is determined that there is the intersection whose type is the merging junction 400 or the fork junction 400' in the area. When it is indicated in the topological relationship that the number of the road boundaries is three and the number of the road boundary pair is three, it is determined that there is the intersection whose type is the T junction 500 in the area. When it is indicated in the topological relationship that the number of the road boundaries is four and the number of the road boundary pair is four, it is determined that there is the intersection whose type is the crossroad 600 in the area. Otherwise, when it is indicated in the topological relationship that the starting point and the ending point of one of the road boundaries in the area are substantially coincident, it is determined that there is the intersection whose type is the roundabout 700 in the area. Alternatively or additionally, when there are other topological relationships other than the topological relationship described above, it is determined that there are no intersections in the area.

The topological relationship (i.e., the relationship between the positions and directions of the road boundaries connected to the intersection) between the road boundaries mentioned herein includes not only the number of the road boundaries, the number of the road boundary pair, and the directions of the road boundary pairs relative to the intersection, but also other topological relationships. That is, the intersection may also be identified using other topological relationships between the road boundaries in addition to the topological relationships described in the above embodiments. The specific positions and specific lengths and angles of the road boundaries are not considered in the topological relationship. Moreover, the intersections in reality are different, but the intersections may be classified into a limited number of types. Therefore, the technique of identifying the intersection type based on the topological relationship between the road boundaries in the present disclosure may be applied to various intersections, and has the characteristics of strong universality.

Figure 9:
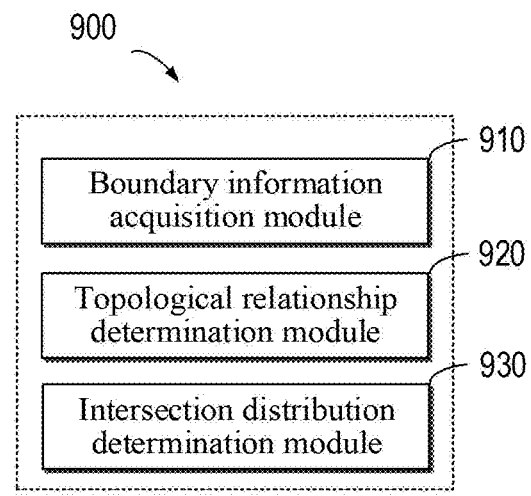
FIG. 9 illustrates a schematic block diagram of an apparatus for identifying an intersection in an electronic map according to some embodiments of the present disclosure.

FIG. 9 illustrates a schematic block diagram of an apparatus for identifying an intersection in an electronic map according to some embodiments of the present disclosure. As shown in FIG. 9, the apparatus 900 includes: a boundary information acquisition module 910, configured to acquire boundary information related to road boundaries from an electronic map; a topological relationship determination module 920, configured to determine a topological relationship between the road boundaries in an area having a predetermined size in the electronic map based on the boundary information; and an intersection distribution determination module 930, configured to determine a distribution of an intersection in the area based on the topological relationship.

Figure 10:
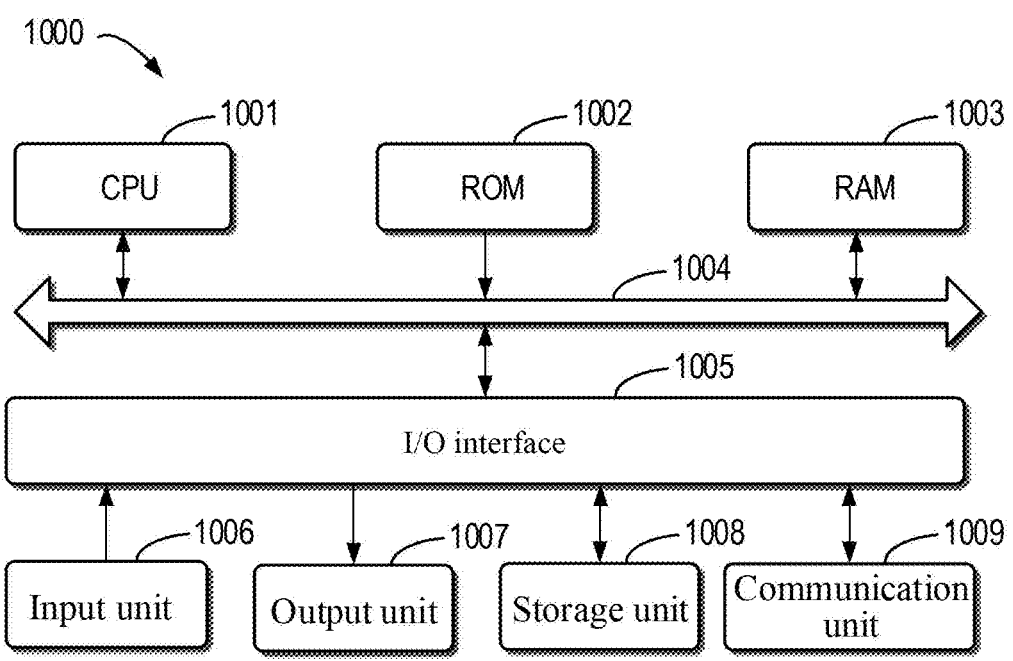
FIG. 10 illustrates a block diagram of a computing device which can implement the plurality of embodiments of the present disclosure.

FIG. 10 shows a schematic block diagram of an illustrative device 1000 capable of implementing various embodiments of the present disclosure. As shown in the figure, the device 1000 includes a central processing unit (CPU) 1001 that may perform various appropriate actions and processing in accordance with computer program instructions stored in a read only memory (ROM) 1002 or computer program instructions loaded into a random access memory (RAM) 1003 from a storage unit 1008. In the RAM 1003, various programs and data required for the operation of the device 1000 may also be stored. The CPU 1001, the ROM 1002, and the RAM 1003 are connected to each other through a bus 1004. An input/output (I/O) interface 1005 is also coupled to the bus 1004.

A plurality of components in the device 1000 are coupled to the I/O interface 1005, including: an input unit 1006, such as a keyboard or a mouse; an output unit 1007, such as various types of displays, or speakers; the storage unit 1008, such as a disk or an optical disk; and a communication unit 1009 such as a network card, a modem, or a wireless communication transceiver. The communication unit 1009 allows the device 1000 to exchange information/data with other devices over a computer network such as the Internet and/or various telecommunication networks.

The processing unit 1001 performs the various methods and processes described above, such as the process 800 and/or the process 900. For example, in some embodiments, the process 800 and/or the process 900 may be implemented as a computer software program that is tangibly embodied in a machine readable medium, such as the storage unit 1008. In some embodiments, some or all of the computer programs may be loaded and/or installed onto the device 1000 via the ROM 1002 and/or the communication unit 1009. When a computer program is loaded into the RAM 1003 and executed by the CPU 1001, one or more of the actions or steps of the process 800 and/or the process 900 described above may be performed. Alternatively, in other embodiments, the CPU 1001 may be configured to perform the process 800 and/or the process 900 by any other suitable means (e.g., by means of firmware).

The functions described herein above may be performed, at least in part, by one or more hardware logic components. For example, and without limitation, illustrative types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although some embodiments of the present disclosure are described in language specific to structural features and/or method logic actions, it should be understood that the subject matter defined in the appended claims is not limited to the specific features or actions described above. Instead, the specific features and actions described above are merely illustrative forms of implementing the claims.

What is claimed is:

1. A method for identifying an intersection in an electronic map, comprising:
acquiring boundary information related to road boundaries from an electronic map;
determining a topological relationship between the road boundaries in an area having a predetermined size in the electronic map based on the boundary information; and
determining a distribution of an intersection in the area based on the topological relationship;
wherein the topological relationship at least includes a number of the road boundaries in the area, and a number of a road boundary pair among the road boundaries; the road boundaries contain road direction information; and
the number of the road boundary pair is determined by:
determining, for a first road boundary in the road boundaries, a second road boundary having a minimum distance from the first road boundary based on the road direction information of the first road boundary, wherein an direction of the first road boundary is identical to an direction of the second road boundary;

determining whether an angle between a tangent line to the first road boundary and the tangent line to the second road boundary is within a preset range; and adding one to the number of the road boundary pair in response to determining that the angle between the tangent lines is within the preset range.

2. The method according to claim 1, wherein the determining a distribution of an intersection in the area based on the topological relationship comprises:

determining, in response to the topological relationship indicating the number of the road boundaries being four and the number of the road boundary pair being three, an existence of the intersection in the area, a type of the intersection being a merging junction or fork junction.

3. The method according to claim 2, wherein the method further comprises:

determining the number of the road boundary pair pointing to the intersection in the three road boundary pairs based on the road direction information;

determining, in response to the number of the road boundary pair pointing to the intersection being one, the intersection as the fork junction; and determining, in response to the number of the road boundary pair pointing to the intersection being two, the intersection as the merging junction.

4. The method according to claim 1, wherein the determining a distribution of an intersection in the area based on the topological relationship comprises:

determining, in response to the topological relationship indicating the number of the road boundaries being three and the number of the road boundary pair being three, an existence of the intersection in the area, a type of the intersection being a T junction.

5. The method according to claim 1, wherein the determining a distribution of an intersection in the area based on the topological relationship comprises:

determining, in response to the topological relationship indicating the number of the road boundaries being four and the number of the road boundary pair being four, an existence of the intersection in the area, a type of the intersection being a crossroad.

6. The method according to claim 1, wherein the determining a distribution of an intersection in the area based on the topological relationship comprises:

determining, in response to the topological relationship indicating a starting point and an ending point of one of the road boundaries in the area being substantially coincident, an existence of the intersection in the area, a type of the intersection being a roundabout.

7. The method according to claim 1, wherein the acquiring boundary information related to road boundaries from an electronic map comprises:

determining a jump point from laser point cloud data used for generating the electronic map, wherein data of the jump point indicates a jump of a road height; and identifying the road boundaries based on the jump point.

8. An apparatus for identifying an intersection in an electronic map, comprising:

at least one processor; and a memory storing instructions, the instructions when executed by the at least one processor, cause the at least one processor to perform operations, the operations comprising:

acquiring boundary information related to road boundaries from an electronic map;

determining a topological relationship between the road boundaries in an area having a predetermined size in the electronic map based on the boundary information; and determining a distribution of an intersection in the area based on the topological relationship;

wherein the topological relationship at least includes a number of the road boundaries in the area, and a number of a road boundary pair among the road boundaries; the road boundaries contain road direction information; and the number of the road boundary pair is determined by:

determining, for a first road boundary in the road boundaries, a second road boundary having a minimum distance from the first road boundary based on the road direction information of the first road boundary, wherein an direction of the first road boundary is identical to an direction of the second road boundary;

determining whether an angle between a tangent line to the first road boundary and the tangent line to the second road boundary is within a preset range; and adding one to the number of the road boundary pair in response to determining that the angle between the tangent lines is within the preset range.

9. The apparatus according to claim 8, wherein the determining a distribution of an intersection in the area based on the topological relationship comprises:

determining, in response to the topological relationship indicating the number of the road boundaries being four and the number of the road boundary pair being three, an existence of the intersection in the area, a type of the intersection being a merging junction or fork junction.

10. The apparatus according to claim 9, wherein the operations further comprise:

determining the number of the road boundary pair pointing to the intersection in the three road boundary pairs based on the road direction information;

determining, in response to the number of the road boundary pair pointing to the intersection being one, the intersection as the fork junction; and determining, in response to the number of the road boundary pair pointing to the intersection being two, the intersection as the merging junction.

11. The apparatus according to claim 8, wherein the determining a distribution of an intersection in the area based on the topological relationship comprises:

determining, in response to the topological relationship indicating the number of the road boundaries being three and the number of the road boundary pair being three, an existence of the intersection in the area, a type of the intersection being a T junction.

12. The apparatus according to claim 8, wherein the determining a distribution of an intersection in the area based on the topological relationship comprises:

determining, in response to the topological relationship indicating the number of the road boundaries being four and the number of the road boundary pair being four, an existence of the intersection in the area, a type of the intersection being a crossroad.

13. The apparatus according to claim 8, wherein the determining a distribution of an intersection in the area based on the topological relationship comprises:

determining, in response to the topological relationship indicating a starting point and an ending point of one of the road boundaries in the area being substantially coincident, an existence of the intersection in the area, a type of the intersection being a roundabout.

14. The apparatus according to claim 8, wherein the acquiring boundary information related to road boundaries from an electronic map comprises:
- determining a jump point from laser point cloud data used for generating the electronic map, wherein data of the jump point indicates a jump of a road height; and
- identifying the road boundaries based on the jump point.

15. A non-transitory computer-readable storage medium storing a computer program, the computer program when executed by one or more processors, causes the one or more processors to perform operations, the operations comprising:
- acquiring boundary information related to road boundaries from an electronic map;
- determining a topological relationship between the road boundaries in an area having a predetermined size in the electronic map based on the boundary information; and
- determining a distribution of an intersection in the area based on the topological relationship;

wherein the topological relationship at least includes a number of the road boundaries in the area, and a number of a road boundary pair among the road boundaries; the road boundaries contain road direction information; and the number of the road boundary pair is determined by:
- determining, for a first road boundary in the road boundaries, a second road boundary having a minimum distance from the first road boundary based on the road direction information of the first road boundary, wherein an direction of the first road boundary is identical to an direction of the second road boundary;
- determining whether an angle between a tangent line to the first road boundary and the tangent line to the second road boundary is within a preset range; and
- adding one to the number of the road boundary pair in response to determining that the angle between the tangent lines is within the preset range.

* * * * *